United States Patent [19]

Brunon

[11] Patent Number: 4,631,167

[45] Date of Patent: Dec. 23, 1986

[54] METHOD FOR THE PRODUCTION OF A NUCLEAR REACTOR ASSEMBLY AND ASSEMBLY OBTAINED BY THIS METHOD

[75] Inventor: Jean-Marc Brunon, Aix en Provence, France

[73] Assignee: Commissariat a l'Energie Atomique, Paris, France

[21] Appl. No.: 594,719

[22] Filed: Mar. 29, 1984

[30] Foreign Application Priority Data

Apr. 8, 1983 [FR] France .................................. 83 05790

[51] Int. Cl.⁴ .............................................. G21C 3/32
[52] U.S. Cl. ..................................... 376/446; 376/436; 376/437; 376/445; 376/451
[58] Field of Search ............... 376/446, 436, 434, 437, 376/445, 451

[56] References Cited

U.S. PATENT DOCUMENTS 4,366,116 12/1982 Christiansen ......................... 376/446

FOREIGN PATENT DOCUMENTS 2046272 3/1971 Fed. Rep. of Germany .
2081770 12/1971 France .
2134104 12/1972 France .
2195823 3/1974 France .

Primary Examiner—Donald P. Walsh

[57] ABSTRACT

The invention relates to a method for producing an assembly, as well as to an assembly produced by this method.

The foot of the assembly is butt welded to the hexagonal tube prior to the introduction of the bundle of rods into the latter. This introduction takes place in the vertical direction using a jack which passes through the foot of the assembly. The upper neutron protection is then fixed by pressing the tube into recesses. Finally, the vacuum producing system and the plug are fitted in the foot.

Application to assemblies for fast neutron nuclear reactors.

10 Claims, 7 Drawing Figures

METHOD FOR THE PRODUCTION OF A NUCLEAR REACTOR ASSEMBLY AND ASSEMBLY OBTAINED BY THIS METHOD

BACKGROUND OF THE INVENTION

The present invention relates to a novel method for the production of an assembly for a nuclear reactor, as well as to an assembly obtained by this method.

The fertile or fuel assemblies used in fast neutron nuclear reactors essentially comprise three parts. Thus, starting from the top, each assembly comprises an upper neutron protection, an intermediate (fissile or fertile) part and a foot or base.

More specifically, the foot or base of the assembly comprises a cylindrical tube welded by its upper end to a solid annular bearing member and by its lower end to a plug having a lock. The annular bearing member has a spherical bearing surface by which the assembly rests on a support which also serves to supply liquid sodium to the assembly. For this purpose, the tube has openings and the bearing member is traversed by an axial passage. The intermediate part comprises a bundle of fuel rods fixed at their upper end to an attachment grid and located in a tube having a polygonal and generally a hexagonal cross-section. Finally, the upper neutron protection is constituted by a solid member, whose centre is traversed by a passage by which the reheated liquid sodium leaves the assembly.

At present, the connection between the three parts of the assembly is brought about by welding the ends of the hexagonal tube to the upper neutron protection and to the bearing member of the assembly foot.

Bearing in mind this latter feature, at least one of the welds connecting the hexagonal tube to the solid parts constituted by the upper neutron protection and the bearing member of the assembly foot must be produced after fitting the bundle of rods into the tube. At present, the bundle of rods is fitted before the production of these two welds.

This production procedure is not satisfactory, particularly for the following reasons.

The making of the welds when the bundle of fuel rods is in place must take place behind a neutron protection. Thus, the welding, inspections and possible repair operations have to be carried out remotely, which involves long and costly handling operations with respect to the assembly.

In view of the safety requirements, a weld having even a very small crack (e.g. of length exceeding 0.2 mm) must be considered as unsatisfactory. However, the presence of the fuel rod bundle within the hexagonal tube makes the inspection of the welds much more difficult. Thus, the more accurate direct, non-destructive inspection methods cannot be used in these conditions and other methods, such as ultrasonic testing, does not make it possible to detect such small cracks.

It is therefore conventional practice to use an inspection procedure consisting of taking testpieces from sample tubes during the production of the assemblies, followed by the performance of appropriate tests and inspections on these testpieces. Thus, such an inspection takes place with a time lag and the results thereof are only available after carrying out one or two series of welds (each series consisting e.g. of 20 welds). Therefore, when a doubtful testpiece has been detected, it is necessary to scrap, or at least consider as dubious, a large number of finished assemblies. Therefore, this method suffers from very high costs and can lead to the immobilization of a large amount of fissile material.

The disadvantage referred to hereinbefore is not only theoretical, because the different geometry of the parts to be welded (relatively thin hexagonal tube and thick solid parts) leads to the formation of an asymmetrical weld bead and causes differential expansions and consequently thermal stresses, which in each case lead to a risk of cracking during welding.

SUMMARY OF THE INVENTION

The present invention relates to a method for the production of an assembly, which does not suffer from the disadvantages of existing methods. In particular, the present invention relates to a method in which all the welds are made before installing the bundle of fuel or fertile rods, so as to make it possible to directly inspect and if necessary repair the welds, prior to the introduction of the rod bundle. The invention also relates to an assembly obtained by such a method.

Therefore, the present invention relates to a method for the production of an assembly incorporating a tube having a polygonal cross-section, a bundle of rods located in said tube, an upper neutron protection part fixed to the upper end of the tube and a hollow assembly foot fixed to the lower end of the tube, wherein it comprises the following successive stages:

fixing the assembly foot and the polygonal tube by butt welding;
inspection of the thus formed weld;
introduction of the bundle of rods into the vertically positioned polygonal tube;
fixing the polygonal tube to the upper neutron protection part by pressing the tube into recesses formed in said part.

In the case where the assembly foot has a detachable vacuum producing system and a detachable plug normally sealing the lower end of the foot, and in accordance with a preferred embodiment of the invention, the vacuum producing system and the plug are not in place during the welding of the foot to the polygonal tube. The bundle of rods is then introduced into the tube by supporting the bundle by means of a jack sliding within the hollow assembly foot, prior to the installation of the vacuum producing system and the plug.

According to a variant of the method according to the invention, the vacuum producing system is connected to the plug by means of a bar and is fitted at the same time as the plug.

According to another variant of the method according to the invention, the assembly foot has a bearing member fixed to the polygonal tube, a foot tube fixed to the bearing member, the vacuum producing system and the detachable plug, the latter being screwed into a thread formed in the foot tube.

In order to reduce to the greatest possible extent the risks of cracking of the weld by which the polygonal tube is fixed to the assembly foot, the tube is preferably force fitted onto a bearing plate of the assembly foot, before being fixed end to end to the latter by welding. The force fitting of the tube onto the bearing plate can then be carried out by either heating the tube, or cold using mechanical means.

The invention also relates to an assembly for a nuclear reactor, incorporating a tube having a polygonal cross-section, a bundle of rods located in said tube, an upper neutron protection part fixed to the upper end of the tube and a hollow assembly foot fixed to the lower end of the tube, wherein the assembly foot has a bearing plate onto which the polygonal tube is force fitted and butt welded, and wherein the upper neutron protection part has recesses into which the tube is pressed, so as to leave a slight clearance between the tube and said part.

BRIEF DESCRIPTION OF THE DRAWINGS

The invention is described in greater detail hereinafter relative to non-limitative embodiments and with reference to the attached drawings, wherein show.

The left-hand and right-hand parts of FIG. 1 are longitudinal sectional views respectively showing the upper and lower portions of a fuel assembly obtained according to the method of the invention.

DETAILED DESCRIPTION OF THE INVENTION

Figure 1:
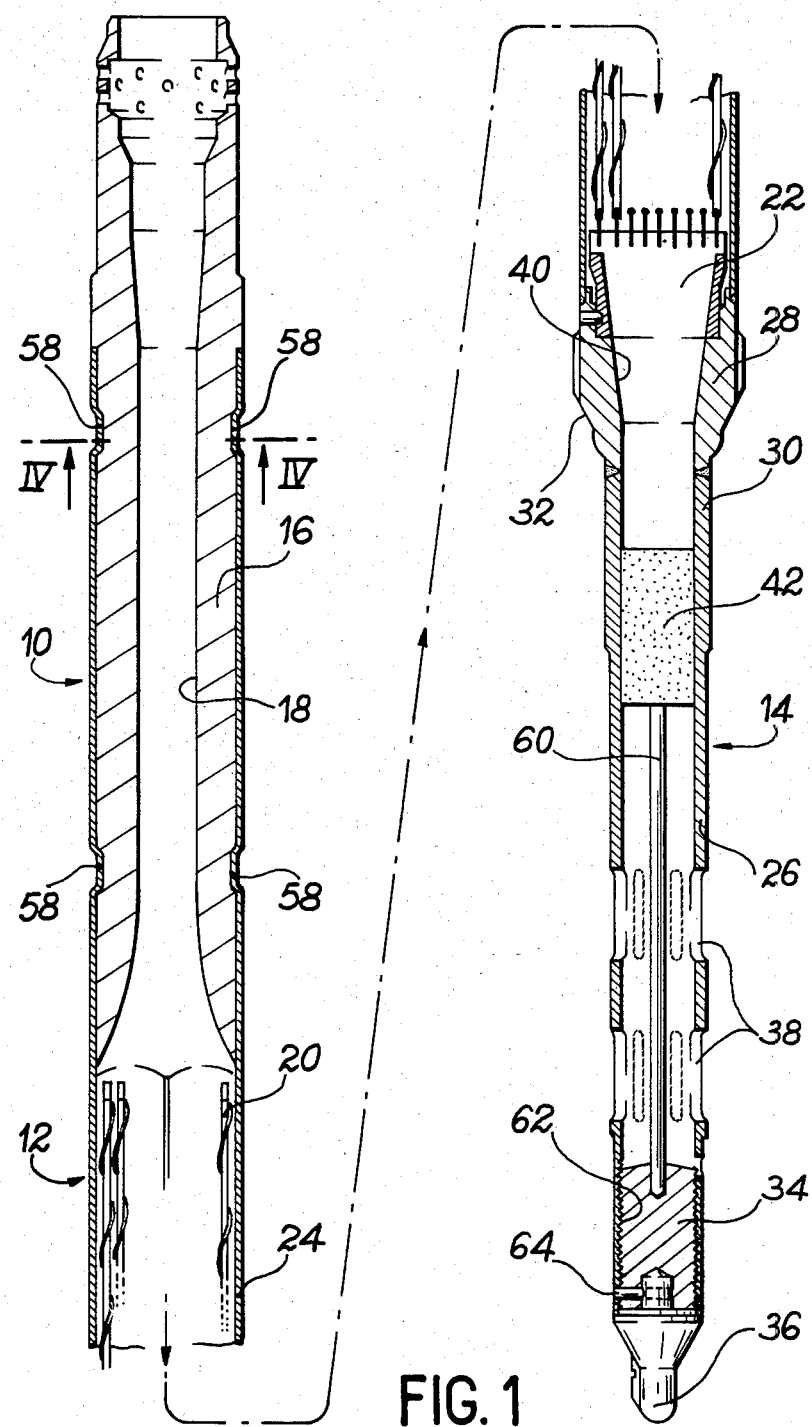

FIG. 1 shows a fuel assembly for use in a fast neutron nuclear reactor. Starting from the top, the assembly essentially comprises an upper neutron protection 10, a fissile part 12 and a foot 14.

The upper neutron protection 10 is constituted by an annular steel block 16 having a passage 18 along the vertical axis of the assembly and via which the sodium reheated by passing through fissile part 12 leaves the assembly.

The fissile part 12 comprises a bundle of fuel rods 20 fixed by their lower end to an attachment grid 22 of known construction. This bundle is located in a hexagonal tube 24.

Finally, the foot or base 14 of the assembly comprises a cylindrical tube 26, which has a smaller diameter than the cross-section of hexagonal tube 24. A solid annular bearing member 28 is fixed by a weld 30 to the upper end of tube 26. The outer face of member 28 is provided with a spherical bearing surface 32 by which the assembly rests on the not shown supply support, which provides the necessary support for the same. The lower part of tube 26 is sealed by a plug 34, whose lower end is provided with a lock 36 acting as a locating pin. Lock 36 ensures that the assembly is not incorrectly positioned within the reactor core.

It is known that assemblies are supplied with liquid sodium by the support, in which are received the feet 14 of the assemblies. Therefore, tube 26 has orifices 38 by which the sodium enters the assembly, whilst bearing member 28 has an axial passage 40 enabling the sodium to rise up to the bundle of fuel rods 20.

The flow of liquid sodium within the assembly is controlled by means of a vacuum producing system 42 located in tube 26 above orifices 38. System 42 can in particular be constituted by a stack of perforated plates, a stack of balls or any other known device making it possible to check at random the sodium flow during the passage thereof through the bundle of fuel rods 20.

According to the invention, the three parts 10, 12 and 14 of the assembly are connected in an original manner and in accordance with a method which will be described hereinafter with reference to FIGS. 2a to 2e.

Initially, a weld 30 is produced between the upper end of the foot tube 26 and the annular bearing member 28. This weld can be immediately checked and if necessary repaired. For a reason which will be shown hereinafter, the fitting of the other elements constituting foot 14 (plug 34 and vacuum producing system 42) is delayed to a later stage of production.

Figure 2:
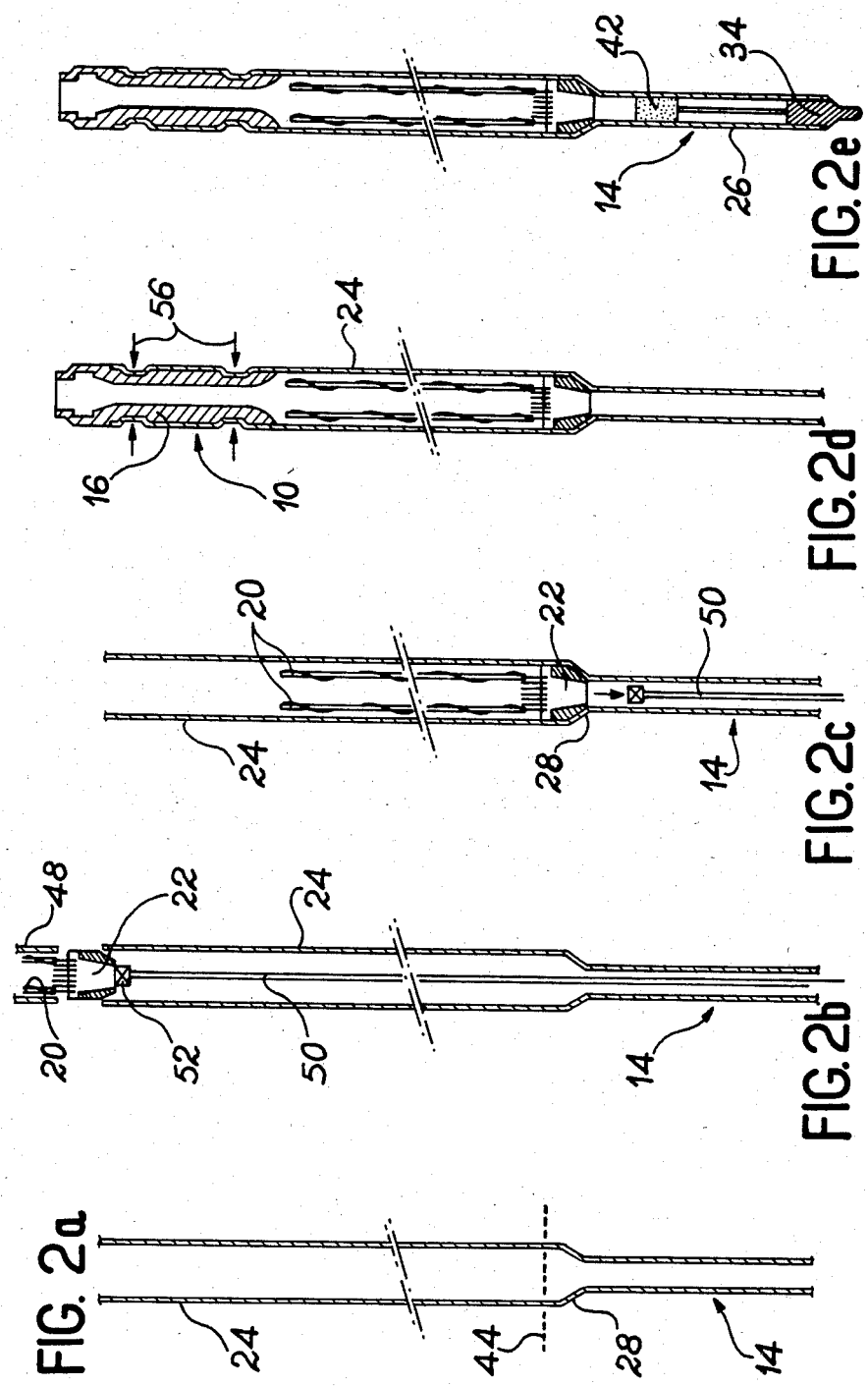
FIGS. 2a to 2e very diagrammatically, the main stages of the method for the production in accordance with the present invention of the assembly of FIG. 1.

As is very diagrammatically illustrated in FIG. 2a, this is immediately followed by the production of weld 44 (broken lines in FIG. 2a) between the bearing member 28 of foot 14 and the hexagonal tube 24.

Figure 3:
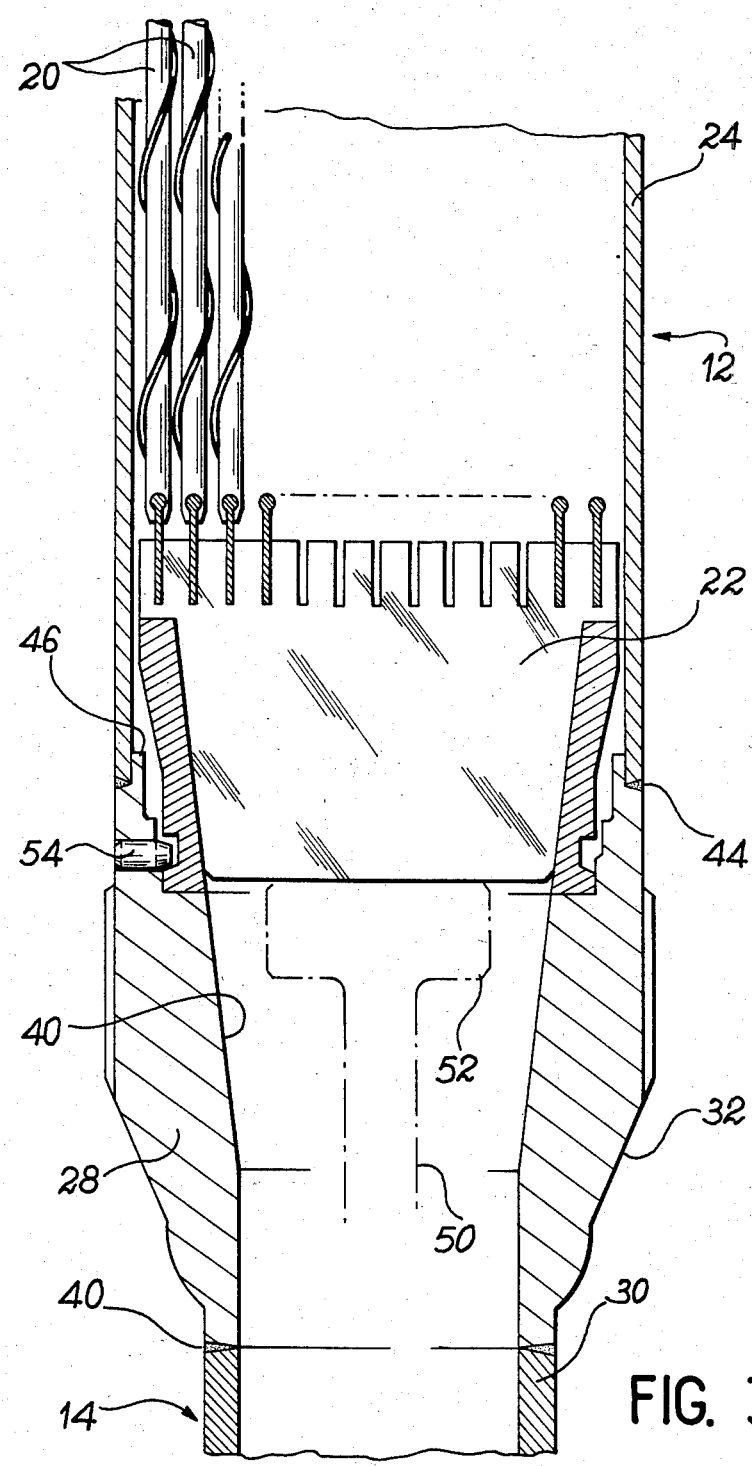
FIG. 3 a sectional view showing on a larger scale the area of the assembly where the hexagonal tube surrounding the bundle of fuel rods is welded to the bearing part of the assembly foot.

More specifically and as shown in greater detail in FIG. 3, the lower end of hexagonal tube 24 is firstly force fitted onto a bearing plate 46 formed at the upper end of bearing member 28 and whereof the external profile is identical to the internal profile of hexagonal tube 24. Preferably, this operation takes place without any machining of the tube. Thus, it has been found that even if the hexagonal tube has certain deformations after its passage through the die, the nominal dimensions thereof are respected, so that a prior machining of the tube, which would be difficult and expensive, is not necessary.

The forced fitting of the hexagonal tube 24 onto the bearing plate 46 of member 28 on the on hand ensures the centering of the tube on said member, and on the other prevents the collapse of the weld 44 during its production.

Two methods can be used for carrying out this force fitting. Firstly, it can be carried out cold, e.g. using a jack or press. The forced fitting of the hexagonal tube onto bearing plate 46 can also be carried out by heating the hexagonal tube to a temperature between e.g. 300° and 400° C.

It should be noted that the weld 44 produced between hexagonal tube 44 and bearing member 28 virtually constitutes a butt weld between these two parts, so that the risks of said weld cracking are greatly reduced.

Immediately following the production of weld 44, the latter can be directly inspected by any appropriate non-destructive inspection or testing means having the desired accuracy. Thus, this inspection is carried out in the absence of the bundle of fuel rods, which makes it possible to fit a sensor, a source of a film within said assembly. These inspections and tests can be carried out immediately, which makes it possible to significantly reduce the costs thereof, so that there is no need to unnecessarily immobilize the fissile material. Moreover, as both the welding and inspection are carried out in a normal atmosphere, the handling operations of the assembly are greatly simplified. If necessary, a defective or doubtful weld can be repaired immediately following its inspection or testing.

On completing the welding of the hexagonal tube to the assembly foot, as well as the inspection and possible repair to said weld, the bundle of fuel rods 20 can be introduced into the hexagonal tube, in the manner diagrammatically shown in FIGS. 2b and 2c.

To this end, FIG. 2b shows that the hexagonal tube 24, welded to foot 14 which still does not have its lower plug and its vacuum producing system, are positioned vertically below the bundle of fuel rods 20, which is also positioned vertically and held in a case 48, A jack, whereof only the preferably telescopic rod 50 is shown, is introduced from the bottom of the assembly through foot 14 and hexagonal tube 24, until the head 52 of the jack comes into contact with grid 22, to which are attached the fuel rods 20.

Obviously, the jack head 52 must be designed so as to pass into the foot tube 26 having a reduced internal diameter (approximately 90 mm) and to ensure an effective support for grid 22. In order to solve this problem, it is either possible to directly bear onto the central rails of grid 22, or to provide head 52 with retractable fingers.

When the head 52 of the jack is in contact with grid 22, the bundle of fuel rods 20, supported by the jack, is progressively lowered into hexagonal tube 24. Obviously, this operation is carried out with constant monitoring of the lowering of the bundle into the tube. This monitoring can consist of a measurement of the apparent weight of the bundle, which is equal to the real weight of the bundle, less the friction thereof within the hexagonal tube and the friction of the jack.

At the end of this operation and as is diagrammatically shown in FIG. 2c and in FIG. 3, the grid bears against bearing member 28 of the assembly foot and the jack rod is completely disengaged from the assembly foot. As illustrated in FIG. 3, the locking of grid 22 onto bearing member 28 can be carried out by any simple mechanical means, such as a screw 54.

According to another important feature of the invention and as illustrated in FIG. 2d, the weld normally used for fixing the block 16 constituting the upper neutron protection, to the hexagonal tube 24 is eliminated and is replaced by a pressing operation, as is diagrammatically illustrated by arrows 56 in FIG. 2d.

Figure 4:
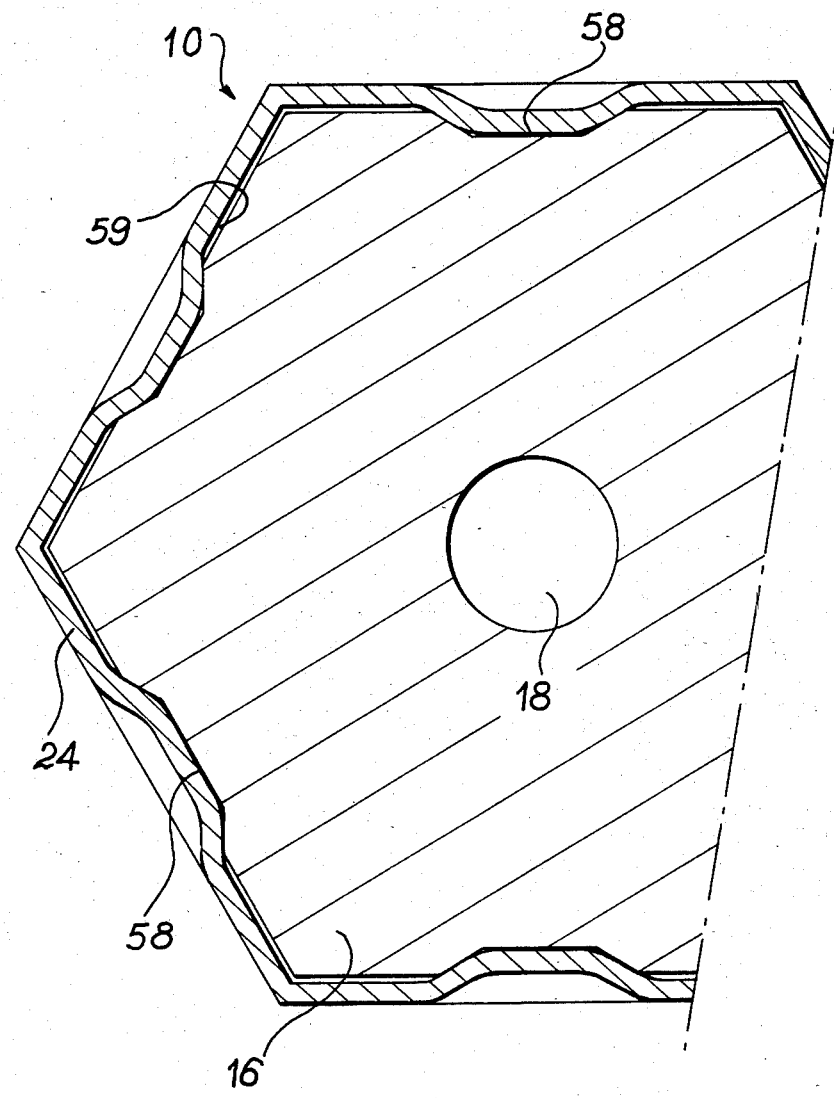
FIG. 4 a cross-section of the assembly along line IV—IV of FIG. 1.

More specifically, and as can best be seen in FIGS. 1 and 4, recesses 58 are firstly formed on the hexagonal outer surface of solid member 16 constituting the upper neutron protection. For examle, two rows of six recesses 58 can be produced on member 16 and each recess in the same row is produced on one of the outer faces of member 16. It should be noted that these recesses do not form a continuous groove on the periphery of block 16 and are in fact separated from one another.

If reference is now again made to FIG. 2d, hexagonal tube 24 is placed around the solid part 16, at least level with recesses 58 and is then pressed into the latter.

This fixing procedure according to the invention makes it possible to obviate any weld on the assembly following the fitting of the bundle of fuel rods, thus eliminating the need for difficult and costly operations.

Moreover and as illustrated in FIG. 4, this solution makes it possible to obtain, by construction, a slight clearance 59 between hexagonal tube 24 and solid part 16, which may be very useful in certain cases.

Thus, in the case where a handling error within the reactor leads to the introduction of the foot of an assembly into passage 18 formed in the upper neutron protection of another assembly already fitted into the core, said latter assembly is blocked. If no means were provided for taking account of this risk, such an error would have the effect of preventing the evacuation of the residual power and would lead to a dangerous heating of the assembly. To ensure that such an incident does not take place, at present slots are formed in the upper neutron protection of the assemblies, which make it possible to ensure an adequate sodium circulation in the case of a blockage. According to the present invention, there is no need to produce such slots, because the connection between the hexagonal tube and the upper neutron protection is not tight and in itself permits a sodium circulation, which can be defined by construction, so as to be adequate in the case of a blockage.

The existence of a clearance between the upper neutron protection and the hexagonal tube also makes it possible to very easily solve the problem which occurs during the fracture of a can during the transportation of the assembly, after the latter has been irradiated in the reactor core. Thus, as the assemblies are transported in a sloping manner, a can fracture would have the effect of releasing fission gases which accumulate at the bottom of the upper neutron protection. If no solution was provided to this problem, the fission gases would prevent the sodium from cooling the top of the fuel rods during transportation, which would lead to further can fractures. At present, this problem is solved by forming recesses at the top of the hexagonal tubes and by making these recesses prior to the transportation of the irradiated assemblies. It is obvious that the leak which exists by construction between the hexagonal tube and the upper neutron protection according to the invention makes it unnecessary to produce such recesses.

The same remark is made hereinbefore obviously also applies to all the other cases whereas a gas such as argon, might be trapped in the angles at the bottom of the upper neutron protection and would lead to a poor cooling of the corresponding part thereof, particularly the weld.

When the upper neutron protection is fixed to the remainder of the assembly by crimping in the manner described hereinbefore with reference to FIG. 2d, the vacuum producing system 42, as well as the plug 34 of the assembly foot can be fitted in the manner illustrated in FIG. 2e.

In the represented embodiment, it is proposed to simultaneously introduce the vacuum producing system 42 and the plug 34 by joining them by means of a bar 60 arranged along the vertical axis of the assembly. This fixture can in particular be brought about by screwing plug 34 into a tapping 62 formed on the lower end of tube 26. However, according to the represented embodiment (FIG. 1), the lock 36 is separate from plug 34 and is consequently fitted following the introduction of the latter. Lock 36 can more particularly be fixed to plug 34 by any known mechanical means, such as a pin 64.

However, it should be noted that numerous variants are possible thereto without passing beyond the scope of the invention. Thus, the vacuum producing system 42 and the plug 34 can be constituted by two parts, which are not interconnected. The vacuum producing system is then fitted first and then plug 44 is placed at the lower end of tube 26 and is fixed thereto by any appropriate mechanical means, i.e. by screwing using a pin or any other equivalent means. In parallel, plug 34 and lock 36 could be made in one piece.

In the production method described hereinbefore with reference to FIGS. 2a to 2e, it is essential that the bundle of fuel rods is introduced into the hexagonal tube (FIGS. 2b and 2c) in the vertical position. Preferably, the production of weld 44, as well as the crimping 56 (FIGS. 2a and 2d) also take place in the vertical position. However, this is not indispensable and it would also be possible to envisage performing these operations in another position. Finally, the introduction of the vacuum producing system 42 and the plug 34 into foot tube 26, as shown in FIG. 2e, could be carried out in any random position.

According to the preferred embodiment of the method according to the invention described hereinbefore, the introduction of the bundle of fuel rods into the hexagonal tube takes place by means of a jack introduced through the foot of the assembly and provided with the vacuum producing system 42 and the plug 34.

However, according to a not shown variant applied to a bundle of fuel rods having e.g. at its upper end a grid provided with a gripping means, the bundle can also be introduced with the aid of a grapnel or any similar system positioned above the hexagonal tube. In this case, the fitting of the vacuum producing system 42 and plug 34 into foot tube 26 can be carried out either before or after the introduction of the bundle of fuel rods into the hexagonal tube.

Finally, it is obvious that the description given thereinbefore relative to a fuel assembly also applies to the production of a fissile assembly, the bundle of fuel rods then being replaced by a bundle of fissile rods.

What is claimed is:

1. A method for the production of an assembly incorporating a tube having a polygonal cross-section, a bundle of rods located in said tube, an upper neutron protection part fixed to the upper end of the tube and a hollow assembly foot fixed to the lower end of the tube, wherein it comprises the following successive stages:
   fixing the assembly foot and the polygonal tube by butt welding;
   inspection of the thus formed weld;
   introduction of the bundle of rods into the vertically positioned polygonal tube;
   fixing the polygonal tube to the upper neutron protection part by pressing the tube into recesses formed in said part.

2. A production method according to claim 1, in which the assembly foot has a detachable vacuum producing system and a detachable plug which normally seals the lower end of the foot, wherein the vacuum producing system and the plug are not in place during the welding of the foot to the polygonal tube, the introduction of the bundle of rods into the tube being carried out by supporting the bundle by means of a jack through the hollow assembly foot, prior to the fitting of the vacuum producing system and the plug.

3. A production method according to claim 2, wherein the vacuum producing system is connected to the plug by means of a bar and is fitted at the same time as the plug.

4. A production method according to claim 2, wherein the assembly foot has a bearing member fixed to the polygonal tube, a foot tube fixed to the bearing member, the vacuum producing system and the detachable plug, wherein the plug is screwed into a thread formed in the foot tube.

5. A production method according to claim 1, wherein the polygonal tube is force fitted onto a bearing plate of the assemby foot, prior to the end to end fitting to the latter by welding.

6. A production method according to claim 5, wherein the force fitting of the tube to the bearing plate takes place cold using mechanical means.

7. A production method according to claim 5, wherein the force fitting of the tube onto the bearing plate is carried ut by heating said tube.

8. An assembly for a nuclear reactor, incorporating a tube having a polygonal cross-section, a bundle of rods located in said tube, an upper neutron protection part fixed to the upper end of the tube and a hollow assembly foot fixed to the lower end of the tube, wherein the assembly foot has a bearing plate onto which the polygonal tube is force fitted and butt welded, and wherein the upper neutron protection part has recesses into which the tube is pressed, so as to leave a slight clearance between the tube and said part.

9. An assembly according to claim 8, in which the assembly foot has a detachable plug and a vacuum producing system, wherein the vacuum producing system is connected to the detachable plug by a bar.

10. An assembly according to claim 8, in which the assembly foot has a bearing member fixed to the polygonal tube, a foot tube fixed to said bearing member, a vacuum producing system and a detachable plug, wherein the foot tube has a thread into which the plug is screwed.

* * * * *